(12) United States Patent
Lohmann

(10) Patent No.: US 7,696,468 B2
(45) Date of Patent: Apr. 13, 2010

(54) DEVICE FOR DETECTING OBJECTS IN A MONITORED AREA

(75) Inventor: Lutz Lohmann, Olching (DE)

(73) Assignee: Leuze Lumiflex GmbH & Co. KG, Fuerstenfeldbruck (DE)

( * ) Notice: Subject to any disclaimer, the term of this patent is extended or adjusted under 35 U.S.C. 154(b) by 46 days.

(21) Appl. No.: 11/896,572

(22) Filed: Sep. 4, 2007

(65) Prior Publication Data

US 2008/0061221 A1   Mar. 13, 2008

(30) Foreign Application Priority Data

Sep. 2, 2006   (DE) .................. 10 2006 041 251

(51) Int. Cl.
  *G06M 7/00* (2006.01)
  *G08B 13/18* (2006.01)
(52) U.S. Cl. ...................... 250/221; 340/555
(58) Field of Classification Search ............... 250/216, 250/221, 222.1; 340/555–557, 641–642; 356/152.1, 153
  See application file for complete search history.

(56) References Cited

U.S. PATENT DOCUMENTS 5,736,930 A * 4/1998 Cappels ...................... 340/642
6,321,172 B1 * 11/2001 Jakob et al. .................. 702/104
6,981,221 B2 * 12/2005 Neudeck ...................... 715/735
2003/0069713 A1 * 4/2003 Friedl et al. .................. 702/127

FOREIGN PATENT DOCUMENTS

| DE | 198 05 606 A1 | 9/1999 |
| DE | 20 2005 002 797 U1 | 9/2005 |
| DE | 10 2005 003 254 A1 | 8/2006 |
| EP | 0 940 623 A1 | 9/1999 |

OTHER PUBLICATIONS

German Office Action, date Apr. 12, 2007, issued in Application No. 10 2006 041 251.6-26.

* cited by examiner

*Primary Examiner*—Georgia Y Epps
*Assistant Examiner*—Don Williams
(74) *Attorney, Agent, or Firm*—Venable LLP; Robert Kinberg; Leigh D. Thelen

(57) ABSTRACT

A device is provided for detecting an object within a monitored area of a machine or installation. The device includes at least one sensor for detecting objects within the monitored area. At least one configuration module is fixedly connected to the machine or the installation. The configuration module includes configuration data for the sensor, wherein the at least one configuration module feeds the sensor with the configuration data upon being connected to the sensor.

11 Claims, 4 Drawing Sheets

DEVICE FOR DETECTING OBJECTS IN A MONITORED AREA

CROSS-REFERENCE TO RELATED APPLICATION

This application claims the priority of German Patent Application No: 10 2006 041 251.6, filed on Sep. 2, 2006, the subject matter of which is incorporated herein by reference.

BACKGROUND

1. Field of Invention

The invention relates to a device for detecting objects inside a monitored area.

2. Description of the Related Art

When performing specific monitoring functions, for example monitoring objects or personnel near potentially dangerous machines or installations, objects are detected via a sensor that needs to be parameterized according to the specific machine or installation. In the event the sensor is defective and needs to be replaced with a new one, the new sensor needs to be provided with identical parameter values. In general, this not only requires a considerable amount of time, but also represents a source for errors. Carelessness of an operator in entering the parameter values for the new sensor may lead to system malfunction during the operation of the new sensor.

German Patent Application 198 05 606 A1 discloses a method for configuring sensors, in which the data for configuring an existing sensor are transferred from an old sensor to a new sensor to be configured. In this process, the old sensor is connected in the non-configured state or the configured state to a module which stores the current configuration of the starting sensor as well as a control sum corresponding to the configuration data. The module is subsequently connected to the sensor to be configured, the data stored in the module are read into the sensor to be configured, and a control sum is computed which corresponds to the read-in data. The computed control sum is then compared in the module to the stored control sum and an error message generated if these two control sums do not match.

The aforementioned method has the advantage that configuration data can be transferred completely from one sensor to another sensor, thus considerably facilitating the parameterization of a sensor.

However, the aforementioned method has a disadvantage in that, where multiple sensors are used for multiple machines, the operator who carries out the parameterization of the sensors is responsible for deciding which sensor is associated with which machine. This is often problematic in that the operator may mistakenly parameterize the wrong sensor for a given machine. In particular, this is a disadvantage with applications for which sensors are used for monitoring functions on complex machines and installations.

SUMMARY OF THE INVENTION

It is thus an object of the present invention to provide a simple method of parameterization of sensors.

The above and other objects are accomplished according to the invention wherein, in one embodiment, there is provided a device for detecting an object within a monitored area of a machine or installation, the device including at least one sensor for detecting the object within the monitored area, and at least one configuration module fixedly connected to the machine or the installation, the at least one configuration module including configuration data for the at least one sensor, wherein the at least one configuration module feeds the at least one sensor with the configuration data upon being connected to the at least one sensor.

An advantage of the foregoing embodiment of the invention is that a fixed mechanical connection exists between a configuration module containing the stored configuration data and an installation or a machine. As a result, the machine-specific or installation-specific configuration data stored in the configuration module are fixedly assigned to the respective installation or the machine. Thus, during parameterization, i.e., during the configuration of sensors, there is a low risk of confusing the sensors. For performing parameterization, the sensor is connected directly to the machine or the installation, so that the configuration data can be transmitted from the configuration module to the sensor. As a result, configuring the sensor with incorrect configuration data intended for a different machine or the installation is consequently avoided with a high degree of certainty.

A further advantage of the foregoing embodiment of the invention is that a defective sensor can be replaced with a new sensor by simply removing the defective sensor from the configuration module and replacing it with the new sensor. The new sensor then takes over the configuration data from the configuration module, in the same way as the old sensor, thereby ensuring that the new sensor is configured identically to the old sensor. Also, as a result of the fixed mechanical connection between the configuration module and the machine or the installation, it is ensured that the new sensor is provided with the correct configuration data adapted to the machine or the installation.

In principle, the respective configuration data can be read into the configuration module prior to start-up of the device and can be stored therein. During the subsequent operating phase of the device, the respective sensor connected to the configuration module then takes over the configuration data from the configuration module. The configuration data for a sensor generally can also be read into the configuration module during a first-time connection of a sensor and can be stored therein. If the sensor is replaced with a new sensor, then the new sensor can take over the configuration data of the old sensor.

The fixed mechanical connection between the configuration module and the respective machine or installation may be via a cable, wherein the configuration module is integrated into the cable itself or into a plug attached to the cable. Integrating the configuration module into a cable or a plug results in a particularly simple and space-saving arrangement of the configuration module.

The configuration module can furthermore be provided with a bus terminal, so that the configuration module is fixedly connected via a bus system to the respective machine or installation. This type of embodiment is particularly suitable for complex applications, such as installations of multiple sensors for monitoring one or more machines or installations. The configuration module in that case can also be integrated into a plug in order to save space.

The device according to a simple embodiment of the invention comprises a configuration module with a fixed mechanical connection to a machine or an installation. In general, several configuration modules including specific configuration data can also be provided and can respectively be connected via a fixed mechanical connection, for example a cable, to the machine or the installation and can be used to configure the sensors to be connected. In particular, different machine-specific or installation-specific configuration data can be stored in the individual configuration modules, corresponding to the location of attachment of the sensor on the machine or the installation.

The sensors may be embodied as optical sensors, especially area distance sensors or light grids. The sensors may function as safety sensors, which are designed from a safety-technical point of view so that they can be utilized in the area of personnel protection.

BRIEF DESCRIPTION OF THE DRAWINGS

These and other features and advantages of the invention will be further understood from the following detailed description of the preferred embodiments with reference to the accompanying drawings.

DETAILED DESCRIPTION

Figure 1:
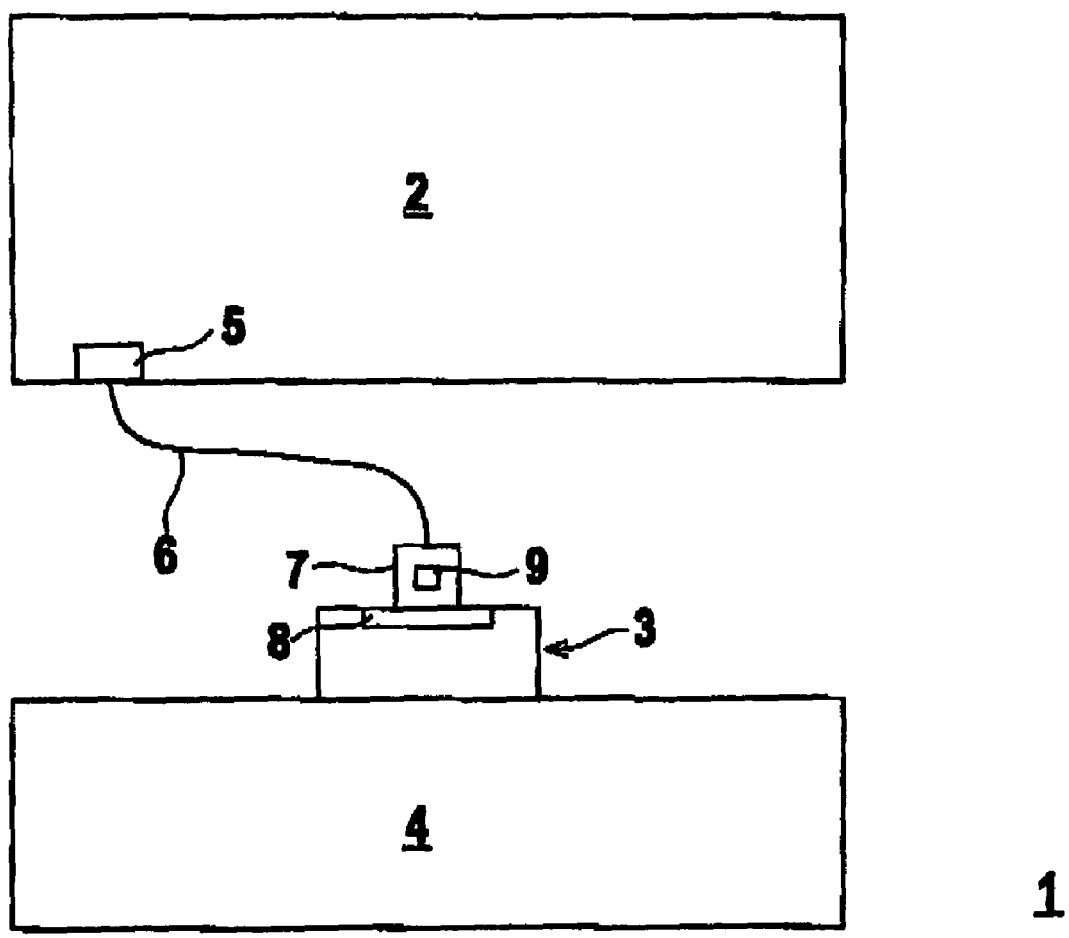
FIG. 1 depicts a schematic representation of a device for securing a danger zone on a machine, according to an embodiment of the invention.

FIG. 1 shows a schematic view of an embodiment of the invention wherein a device 1 is used for securing a danger zone on a machine 2. The machine 2 may include a press or other devices that can be dangerous to personnel working within in a danger zone surrounding the machine 2. An optical sensor 3 is used to monitor a danger zone of the machine 2 to prevent danger to the personnel. To do so, the optical sensor 3 detects objects within a monitored area 4, the dimensions of which are adapted to the size of the danger zone. If the optical sensor 3 detects an object intervention within the monitored area 4, it generates a corresponding object detection signal, which functions as a control signal for the machine 2 and shuts down the machine 2 in order to avoid the danger.

The optical sensor 3 is linked to the machine 2 via a cable 6. The machine 2 is provided with a plug-and-socket connection 5 for connecting the cable 6. The free end of the cable 6 contains a plug 7 for connecting the cable 6 to the optical sensor 3. The optical sensor 3 includes a socket 8 or the like into which the plug 7 can be inserted.

The configuration module 9 may be integrated into the plug 7. Alternatively, the configuration module 9 may be integrated directly into the cable 6.

The configuration module 9 essentially includes a storage unit, which may be a non-volatile memory. The configuration module 9 may simply include a non-volatile data memory such as an EEPROM, provided without inherent intelligence and thus without its own computation unit. The input or read-out of data takes place via the computing units integrated into the optical sensor 3. The non-volatile data memory includes a standard memory interface which is provided with four pins for transmitting the supply voltage and the data, as well as a clock pulse line to the data memory.

The configuration module 9 is used to store configuration data, which comprise specific data for a predetermined application. Such data may be used, for example, to secure the danger zone of the machine 2 by determining and defining the operation of the optical sensor 3. The configuration module 9 may be integrated into the plug 7 to establish a fixed mechanical connection with the machine 2 through the cable 6.

The optical sensor 3 is configured automatically once it is connected to the plug 7. As soon as the connection between the optical sensor 3 and the plug 7 is established, the optical sensor 3 receives the configuration data from the configuration module 9 and is configured to operate without a need for further adjustments. Once the optical sensor 3 is activated, a check may be performed to determine whether or not a configuration memory is connected. Following the activation of the optical sensor 3, data from the configuration module 9 are read in via the computing units integrated into the optical sensor 3. The configuration module 9 is fixedly assigned to the machine 2 via the mechanical connection between the configuration module 9 and the machine 2, thus preventing an incorrect configuration of the optical sensor 3. In particular, the fixed assignment of the configuration module 9 to the machine 2 can also prevent confusion during the configuration of multiple optical sensors 3, which occurs especially during the replacement of the optical sensors 3. For example, if an optical sensor 3 used for monitoring the danger zone on a machine 2 is defective and needs to be replaced with a new optical sensor 3, the old optical sensor 3 is removed from the plug connector 7 and is replaced with a new optical sensor 3. The new optical sensor 3 then takes over the configuration data from the configuration module 9 in the plug connector 7 in the same way as the old one, thereby ensuring that the new optical sensor 3 is configured identically to the old optical sensor 3.

Figure 2:
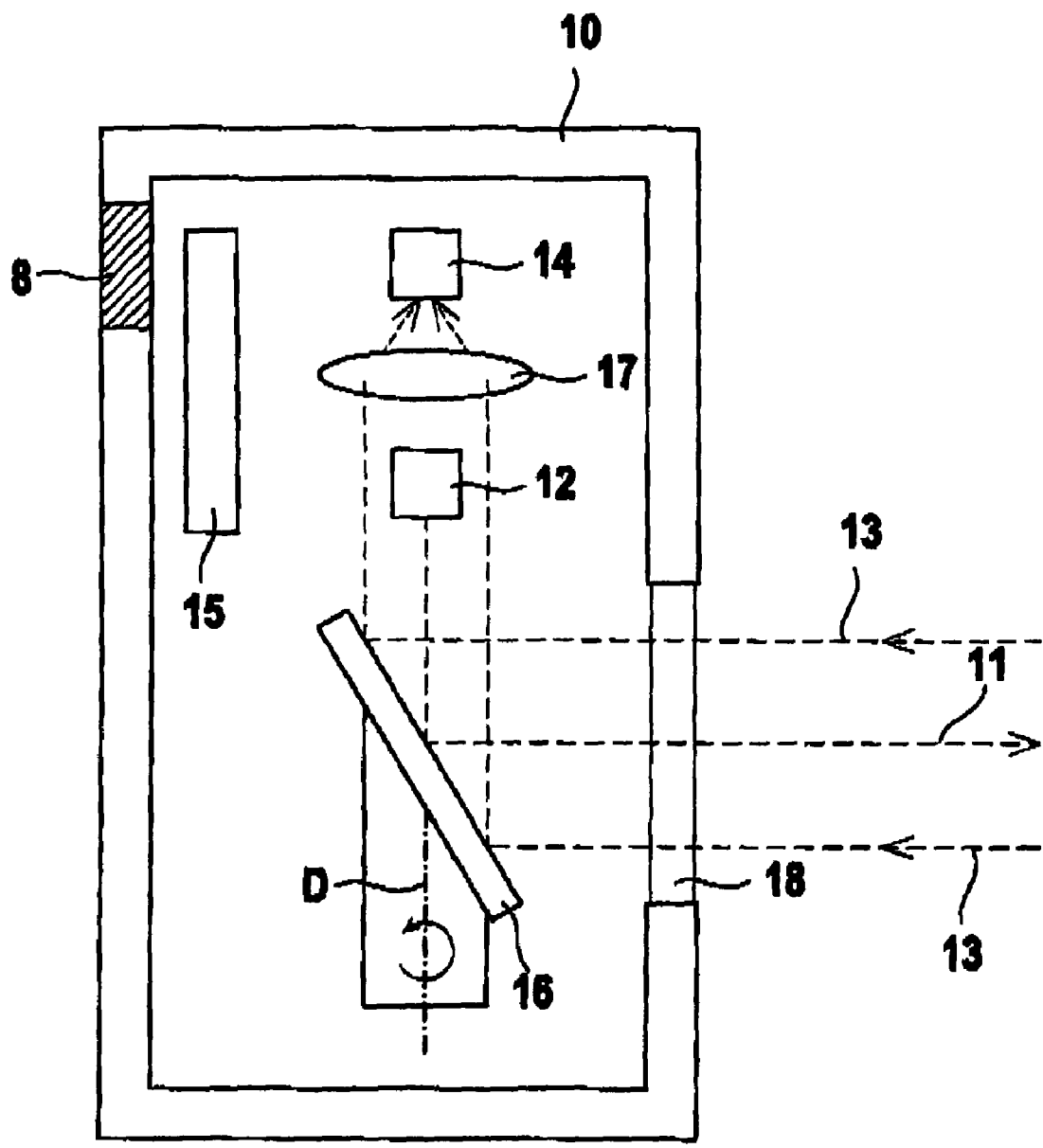
FIG. 2 depicts a schematic representation of a sensor including an area distance sensor, according to an embodiment of the invention.

Referring now to FIG. 2, there is shown an optical sensor 3 according to an embodiment of the invention, which can be used with the device 1 of FIG. 1.

In the embodiment shown in FIG. 2, the optical sensor 3 is an area distance sensor integrated into a casing 10. The socket 8 for connecting the plug connector 7 is integrated into a wall of this casing. The area distance sensor includes a transmitter 12 that emits light rays 11 and a receiver 14 in the form of a light-receiving unit for receiving the light rays 13. The distance may be measured using transit-time principle, in which the transmitter 12 emits light in the form of short light pulses and the transit time of the light pulses to reach an object to be detected and reflect back to the receiver 14 is recorded as a measure for the distance to this object and is subsequently evaluated. An evaluation unit 15 is used for evaluating the signals received at the receiver output 14. If the optical sensor 3 is used for the purpose of personnel protection, two or more evaluation units 15 may be provided as, e.g., two microcontrollers that cyclically monitor each other. The sensor 3 thus provides further safety.

The optical sensor 3 may further include a deflection unit 16 in the form of a motor-driven deflection mirror, which can rotate around an axis of rotation D. The transmitter 12 and the receiver 14 are positioned along the axis of rotation D. A receiving optic 17 is positioned between the deflection unit 16 and the receiver 14. The transmitting light rays 11 are deflected over the deflection mirror 16 to an area of coverage that is positioned in a plane. Similarly, the receiving light rays 13 are received from the plane and are deflected over the deflection mirror 16 to be received by the receiver 14. The angular region scanned by the transmitting light rays 11, which defines the area of coverage, can be specified by suitably dimensioning the width of an exit window 18 in the casing 10 through which the transmitting light rays 11 and the receiving light rays 13 are conducted.

A protective zone in the form of the monitored area 4 can be defined within the area of coverage by entering parameter values, e.g., for the edges along the protective zone. To do so, the evaluation unit 15 of the area distance sensor generates a binary switching signal as an object detection signal for controlling the machine 2 based on whether an object is detected within the protective zone. The machine 2 is then shut down in the event that an object is detected inside the protective zone.

The parameters defining the protective zone represent machine-specific configuration data, which are stored in the configuration module 9 and are read out of the configuration module 9 when the optical sensor 3 is connected to the plug connector 7.

Figure 3:
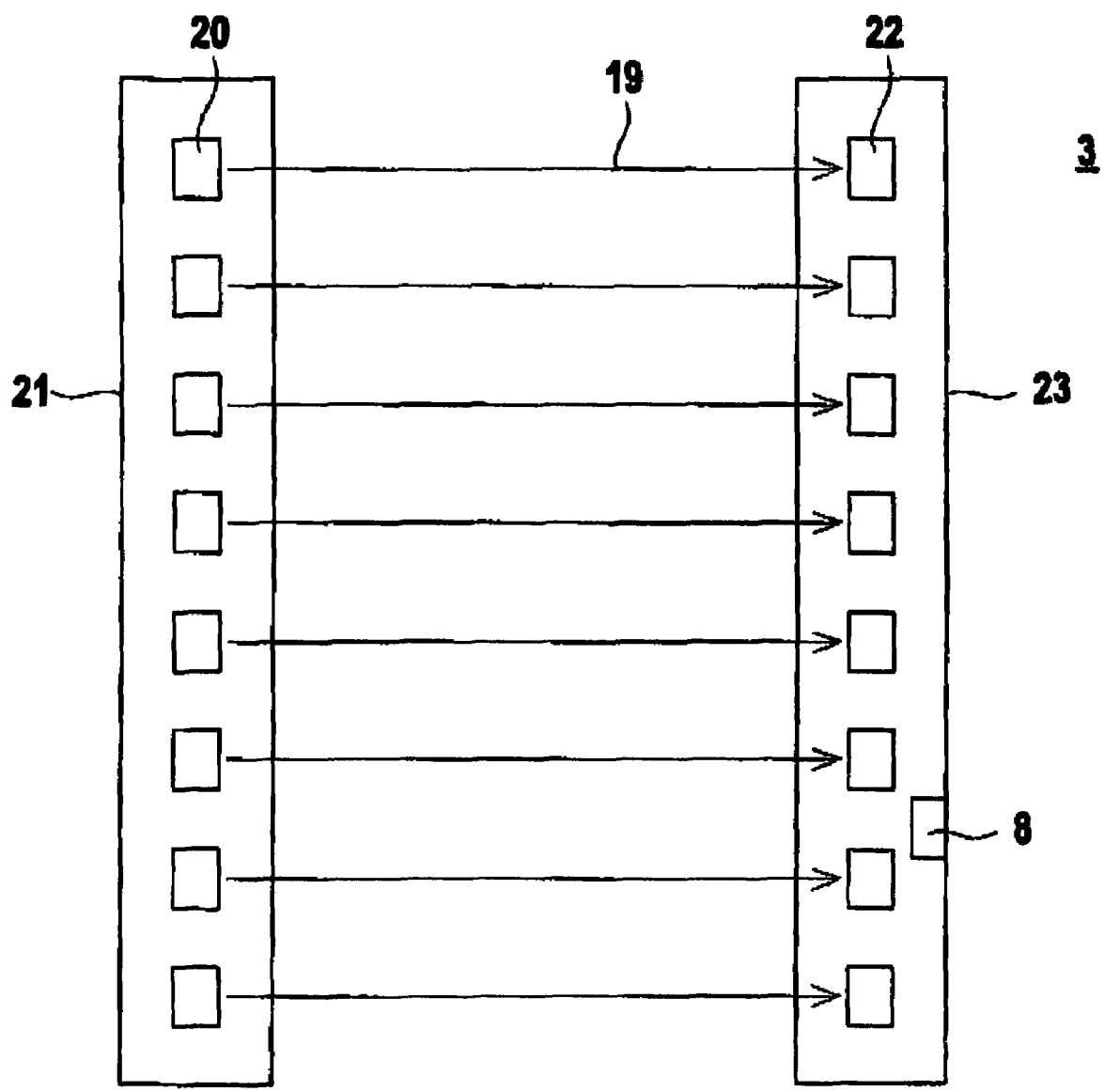
FIG. 3 depicts a schematic representation of a sensor including a light grid, according to an embodiment of the invention.

Referring to FIG. 3, there is shown a light grid optical sensor 3 according to an embodiment of the invention. The light grid comprises inside a first casing 21 a row of transmitting elements 20 that emit light rays 19 and a corresponding row of receiving elements 22 inside a second casing 23 that receive the light rays 19. The transmitting elements 20 may be activated cyclically via a transmitting unit (not shown), while the receiving elements 22 are synchronously activated cyclically via a receiving unit (also not shown). The transmitter activation and the receiver activation are synchronized optically via the light rays 19 conducted from the transmitting elements 20 to the receiving elements 22. In the process, the light rays 19 emitted by each transmitting element 20 are conducted to a corresponding receiving element 22. The corresponding pairs of transmitting elements 20 and receiving elements 22 represent the beam axes of the light grid in which the light rays 19 of the beam axes define the area of coverage within which the objects can be detected. An object detection signal is generated in the receiving unit based on the receiving signals received by the receiving elements 22. An object is considered to be detected if at least one of the beam axes is missing. The receiving unit may also include an evaluation unit 15 for evaluating the receiving signals of the light grid. In embodiments of the invention where the sensor 3 is used for personnel protection, the light grid is embodied as a safety sensor. For that purpose, two or more evaluation units 15 may be provided, e.g., in the form of two micro-controllers that cyclically monitor each other.

Depending on the application, i.e., depending on the prevailing conditions at the machine 2 which is to be monitored with the light grid, the monitored area 4 can be defined by either all or some of the beam axes of the light grid. In the latter case, specific beam axes are deactivated to blank the desired part of the light grid such that an object intervention within these beam axes does not result in an object being mistakenly reported in the monitoring area 4, causing the machine 2 to shut down. Such blanked areas are specified via parameter values, which can be stored as configuration data in the configuration module 9. The socket 8, which serves to connect the plug 7 to the configuration module 9, is integrated into one wall of the casing 23.

Figure 4:
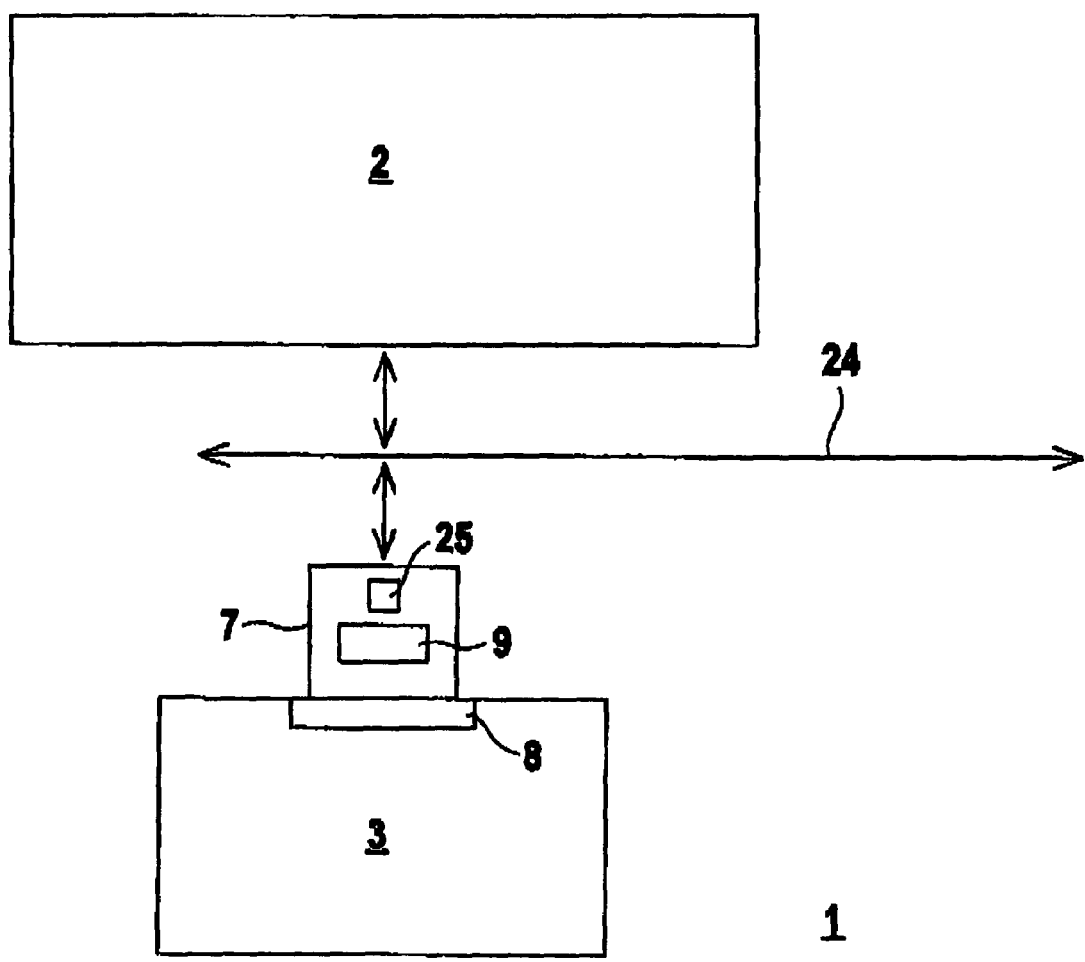
FIG. 4 depicts a device for securing a danger zone on a machine, according to an alternative embodiment of the invention.

FIG. 4 shows a schematic view of a device according to an alternative embodiment of the invention. Similar to the embodiment shown in FIG. 1, the device 1 of FIG. 4 also has a configuration module 9 that is integrated into a plug 7 and is connected via a fixed mechanical connection to a machine 2. An optical sensor 3 is also connected to the plug 7, which is used for monitoring the danger zone and includes a socket 8 for the connection to the plug 7. If the optical sensor 3 is connected to the plug 7, configuration data can be transferred from the configuration module 9 to the optical sensor 3 for configuring the optical sensor 3.

Unlike the embodiment according to FIG. 1, the device 1 of FIG. 2 uses bus lines 24 to connect the configuration module 9 to the machine 2. A bus terminal 25 is provided in the plug 7 for establishing the connection to the bus lines 24. The machine 2 and the optical sensor 3 that is connected via the plug 7 thus form components of a bus system. The embodiment according to FIG. 4 is particularly suitable for complex systems, which may require the use of several optical sensors 3 for monitoring one or several machines or installations.

It will be understood that the above description of the present invention is susceptible to various modifications, changes and adaptations, and that the same are intended to be comprehended within the meaning and range of equivalents of the appended claim.

What is claimed is:

1. A device for detecting an object within a monitored area of a machine or installation comprising:
   at least one sensor for detecting an object within the monitored area; and
   at least one configuration module fixedly connected to the machine or the installation, the at least one configuration module storing configuration data for the at least one sensor,
   wherein the at least one configuration module feeds the at least one sensor with the configuration data upon being connected to the at least one sensor,
   wherein the sensor is replaceable and the configuration module is configured to download the configuration data to a new sensor replacing an existing sensor upon connection to the new sensor, and
   wherein the configuration data includes sensor-specific parameter values and is adaptable to take a format specific to the machine or the installation.

2. The device of claim 1, further comprising a cable that connects the configuration module to the machine or installation, wherein the configuration module is integrated into the cable.

3. The device of claim 1, further comprising a plug that connects the configuration module to the machine or installation, wherein the configuration module is integrated into the plug.

4. The device of claim 3, wherein the configuration module comprises a non-volatile data memory.

5. The device of claim 3, further comprising a cable adapted to connect the plug to the machine or installation.

6. The device of claim 3, wherein the plug comprises a bus terminal adapted to connect to a bus system to which the machine or the installation are connected.

7. The device of claim 1, wherein the sensor is configured to read the configuration data from the configuration module during operation of the sensor.

8. The device of claim 1, wherein the sensor comprises an optical sensor.

9. The device of claim 1, wherein the sensor comprises a safety sensor.

10. The device of claim 1, wherein computing units integrated into the at least one sensor are configured to receive and read the configuration data.

11. The device of claim 1, wherein the at least one sensor is capable of emitting an object detection signal to shut down the machine or installation if an object is detected in the monitored area.

* * * * *